Sept. 20, 1949.  W. A. BRECHT  2,482,459
LOCOMOTIVE AXLE DRIVE MECHANISM
Filed March 3, 1945  2 Sheets-Sheet 1
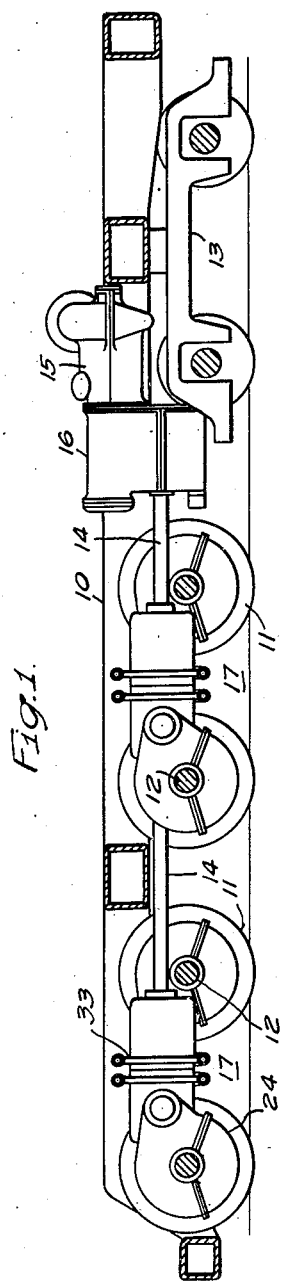
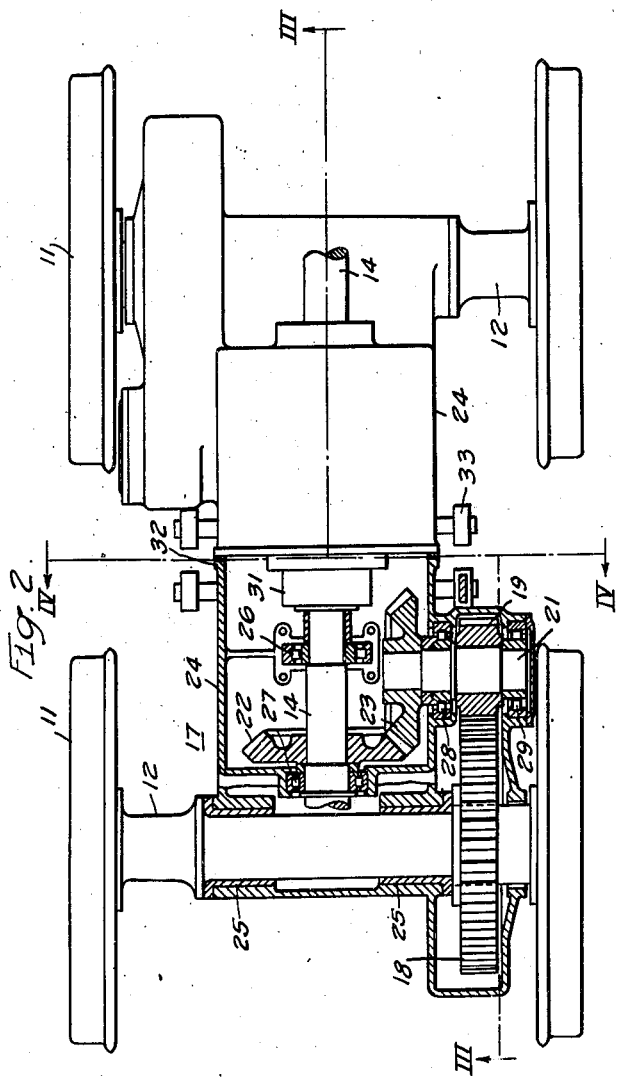
INVENTOR
Winston A. Brecht.
BY
ATTORNEY Sept. 20, 1949.  W. A. BRECHT  2,482,459
LOCOMOTIVE AXLE DRIVE MECHANISM
Filed March 3, 1945  2 Sheets-Sheet 2
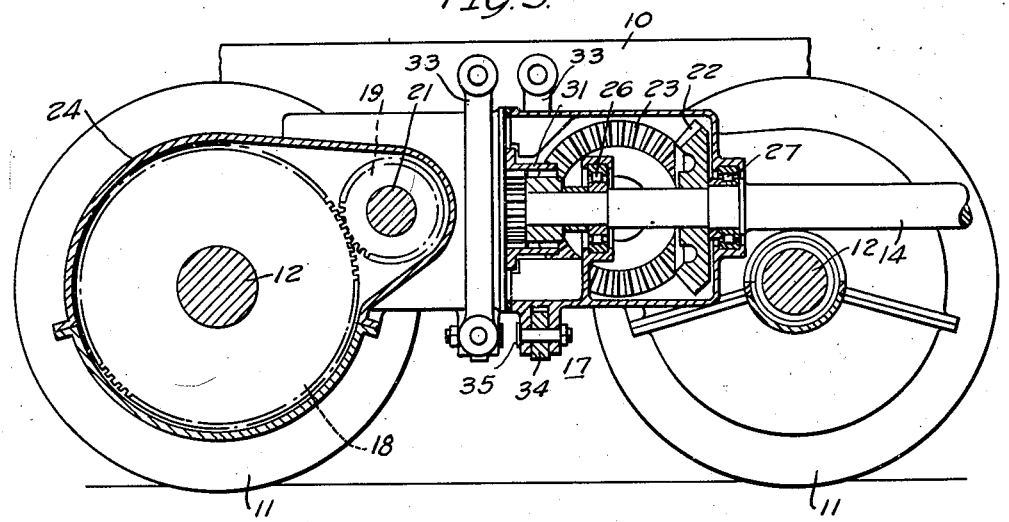
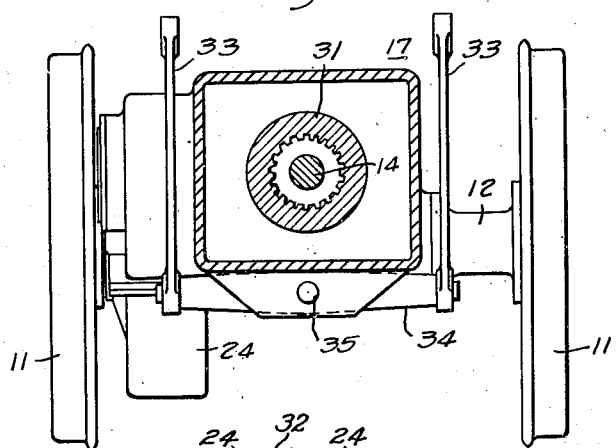
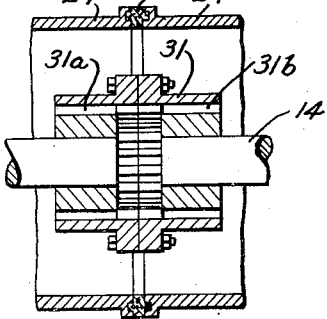
WITNESSES:
INVENTOR
Winston A. Brecht.
BY
ATTORNEY Patented Sept. 20, 1949

2,482,459

UNITED STATES PATENT OFFICE 2,482,459

LOCOMOTIVE AXLE DRIVE MECHANISM

Winston A. Brecht, Pittsburgh, Pa., assignor to Westinghouse Electric Corporation, East Pittsburgh, Pa., a corporation of Pennsylvania Application March 3, 1945, Serial No. 580,798

3 Claims. (Cl. 105—109)

My invention relates, generally, to locomotive drives and, more particularly, to means for driving a plurality of locomotive axles from one source of motive power, such as a steam or gas turbine.

An object of my invention is to provide a locomotive drive which does not require the quill mountings and cup drives heretofore utilized in railway locomotives.

There are two reasons for eliminating the cup drive. First, its torsional flexibility may prove undesirable when two or more axles are driven by one turbine. The torsional flexibility may all be taken up in one direction or the other if the driving wheels on one axle are slightly different in size from those on another axle. This might result in one axle transmitting most or all of the driving torque. Secondly, the elimination of the cup drive will substantially lower the cost of the driving mechanism.

Accordingly, another object of my invention is to ensure an equal division of torque between the driving axles of a locomotive.

A more general object of my invention is to provide a locomotive drive which shall be simple and efficient in operation and which may be economically manufactured and installed.

Other objects of my invention will be explained fully hereinafter or will be apparent to those skilled in the art.

In accordance with one embodiment of my invention, a spur gear is mounted directly on each driving axle and driven by a pinion secured to a shaft on which is mounted a bevel gear which meshes with a second bevel gear mounted on a drive shaft disposed longitudinally of the locomotive. These gears are all contained in a rigid gear case having bearings on the axle. The longitudinal shafts in adjacent gear units are substantially in line and are joined together by flexible couplings. Each gear unit may be suspended from the locomotive frame by two links and a cross beam which engages a trunnion on the gear unit.

For a fuller understanding of the nature and objects of my invention, reference may be had to the following detailed description taken in conjunction with the accompanying drawing, in which:

Figure 1 is a view, partially in section and partially in side elevation, of a portion of a locomotive structure having a drive embodying my invention;

Fig. 2 is an enlarged view, partially in section and partially in plan, of the drive for a pair of adjacent axles of the locomotive;

Fig. 3 is a view, in section, taken along the line III—III of Fig. 2;

Fig. 4 is a view, partially in section and partially in end elevation, the section being taken along the line IV—IV of Fig. 2, and Fig. 5 is an enlarged view, in section, of a flexible coupling and a flexible oil seal utilized in the driving mechanism.

Referring to the drawings and particularly to Fig. 1, the portion of a locomotive structure shown therein comprises a frame 10 which may be supported in the usual manner by driving wheels 11 secured to axles 12 and a guiding truck 13. The portion of the locomotive structure shown is only one section of the locomotive frame and drive, the other section of which is similar to the one illustrated.

As shown in Fig. 1, the axles 12 may be driven by a main drive shaft 14 which extends longitudinally of the locomotive and may be connected to a steam turbine 15, or other suitable prime mover. The turbine 15 may be connected to the drive shaft 14 through a reversing gear unit 16.

In order to transmit torque from the main drive shaft 14 to the axles 12, a gear unit 17 is provided for each one of the driving axles 12. As shown in Figs. 2 and 3, each gear unit 17 comprises a spur gear 18 which is mounted directly on the axle 12 and is driven by a pinion 19 secured to an auxiliary shaft 21 which is disposed at right angles to the drive shaft 14 and parallel to the driving axle 12. The shafts 14 and 21 are connected by bevel gears 22 and 23, one of which is secured to the shaft 14 and the other of which is secured to the shaft 21.

The gears 18, 19, 22, and 23 are all contained in a gear case 24 which is journaled on the axle 12 and is provided with sleeve bearings 25 on the axle. Roller bearings 26 and 27 are provided in the gear case 24 for the drive shaft 14. Roller bearings 28 and 29 are also provided in the gear case 24 for the auxiliary shaft 21.

Since the longitudinally disposed shafts for adjacent gear units are substantially in line, they may be joined together between adjacent gear units by flexible couplings 31, shown most clearly in Figs. 3, 4 and 5. These couplings may be of any type which permits slight angular and parallel misalignment, such as the one illustrated which utilizes two sets of internal-external gears 31a and 31b connected together as shown in Fig. 5. Thus, the different sections of the drive shaft 14 are flexibly joined together to constitute a continuous drive shaft extending longitudinally of the locomotive. Additional flexible couplings may be provided for the drive shaft. A suitable oil seal comprising a gasket 32, shown most clearly in Fig. 5, may be provided between adjacent gear cases 24, thereby making it possible to provide oil in the gear cases to lubricate the gears and the bearings.

As shown most clearly in Fig. 4, each gear unit is suspended from the locomotive frame by a pair of links 33 and a cross beam 34 which engages a trunnion 35 located at the bottom of the gear unit. Since one end of the gear unit is borne directly by the axle 12, and the other end is supported at a single point by the cross bar 34 and the trunnion 35, the gear unit is suspended in a manner similar to the suspension of an axle-hung railway motor.

The upper ends of the links 33 are fastened to the spring borne locomotive frame, and they may be so located as to minimize the misalignments of the couplings for the shaft 14. The structure is such that there is sufficient clearance between the longitudinal shaft 14 and the axles 12 to prevent them from striking together under maximum deflection of the locomotive springs.

As shown in the drawings, the gear units for adjacent axles are identical since the shaft 14 is located along the center line of the locomotive. Thus, it is necessary to manufacture gear units of only one design for a complete locomotive.

With the structure shown, a gear unit can be blocked up and an axle with its wheels dropped out of the locomotive by removing the lower portion of the gear case. If desired, an entire gear unit may be readily dropped out of the locomotive for inspection or repair.

If desired, a slight amount of torsional flexibility may be provided in either the gear 18 or the pinion 19 to absorb impacts. This may be done in a manner well known in the art by providing spring members between the gear center and the gear rim to afford the desired amount of flexibility.

From the foregoing description, it is apparent that I have provided a locomotive drive which is relatively simple in construction and which ensures an equal division of torque between axles which are driven from the same power source. The present drive also has sufficient flexibility to permit the misalignments encountered during the operation of railway locomotives.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a locomotive drive, in combination, a pair of axles, a gear unit for each axle, each gear unit having a drive shaft disposed longitudinally of the locomotive and an auxiliary shaft disposed substantially parallel to its axle, bevel gear means for interconnecting the drive shaft and the auxiliary shaft of each unit, spur gears for connecting each auxiliary shaft to its axle, flexible coupling means disposed substantially midway between said axles for connecting together the drive shafts of the two units, and a gear case for each unit containing all the gears and shafts of said unit, said shafts being journaled in said gear case, said gear cases being journaled on their respective axle, means disposed at opposite sides of said coupling means for individually supporting each gear case from the locomotive frame, each gear case having an open end, said open ends being adjacent, and a flexible seal disposed between said adjacent ends.

2. In a locomotive drive, in combination, a pair of axles, a gear unit for each axle, each gear unit having a drive shaft disposed longitudinally of the locomotive and an auxiliary shaft disposed substantially parallel to its axle, bevel gear means for interconnecting the drive shaft and the auxiliary shaft of each unit, spur gears for connecting each auxiliary shaft to its axle, flexible coupling means disposed substantially midway between said axles for connecting together the drive shafts of the two units, a gear case for each unit containing all the gears and shafts of said unit, said shafts being journaled in said gear case, said gear cases being journaled on their respective axle, swing links disposed at opposite sides of said coupling means for individually suspending each gear case from the locomotive frame, each gear case having an open end, said open ends being adjacent, and a flexible seal disposed between said adjacent ends.

3. In a locomotive drive, in combination, a pair of axles, a gear unit for each axle, each gear unit having a drive shaft disposed longitudinally of the locomotive and an auxiliary shaft disposed substantially parallel to its axle, bevel gear means for interconnecting the drive shaft and the auxiliary shaft of each unit, spur gears for connecting each auxiliary shaft to its axle, flexible coupling means disposed substantially midway between said axles for connecting together the drive shafts of the two units, a gear case for each unit containing all the gears and shafts of said unit, said shafts being journaled in said gear case, said gear cases being journaled on their respective axle, a pair of swing links disposed at opposite sides of said coupling means and a cross bar connecting said links for individually suspending each gear case from the locomotive frame, each gear case having an open end, said open ends being adjacent, and a flexible seal disposed between said adjacent ends.

WINSTON A. BRECHT.

REFERENCES CITED

The following references are of record in the file of this patent:

UNITED STATES PATENTS

| Number | Name | Date |
|---|---|---|
| 1,031,882 | Spangler | July 9, 1912 |
| 1,132,727 | Levin | Mar. 23, 1915 |
| 2,029,981 | Black | Feb. 4, 1936 |
| 2,245,161 | Sheppard | June 10, 1941 |
| 1,367,625 | Pender | Feb. 8, 1921 |

FOREIGN PATENTS

| Number | Country | Date |
|---|---|---|
| 339,110 | England | Dec. 4, 1930 |
| 145,019 | Switzerland | Apr. 16, 1931 |
| 124,469 | Switzerland | Feb. 1, 1928 |